(12) United States Patent
Atkinson et al.

(10) Patent No.: US 7,792,758 B2
(45) Date of Patent: Sep. 7, 2010

(54) SUBSTITUTION GROUPS/INHERITANCE FOR EXTENSIBILITY IN AUTHORIZATION POLICY

(75) Inventors: Bob Atkinson, Woodinville, WA (US); John DeTreville, Seattle, WA (US); Brian A. LaMacchia, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1338 days.

(21) Appl. No.: 10/298,455

(22) Filed: Nov. 18, 2002

(65) Prior Publication Data

US 2004/0098347 A1 May 20, 2004

(51) Int. Cl.
G06F 21/00 (2006.01)
G06F 7/04 (2006.01)
G06F 17/30 (2006.01)
H04N 7/16 (2006.01)

(52) U.S. Cl. .............................. 705/59; 726/27; 726/28; 726/29; 726/30; 726/31

(58) Field of Classification Search .................. 705/59; 726/27–31
See application file for complete search history.

(56) References Cited

U.S. PATENT DOCUMENTS

| | | | |
|---|---|---|---|
| 5,530,235 A | 6/1996 | Stefik et al. | |
| 5,629,980 A | 5/1997 | Stefik et al. | |
| 5,634,012 A | 5/1997 | Stefik et al. | |
| 5,638,443 A | 6/1997 | Stefik et al. | |
| 5,715,403 A | 2/1998 | Stefik | |
| 5,790,664 A | 8/1998 | Coley et al. | |
| 5,920,861 A * | 7/1999 | Hall et al. | 707/9 |
| 6,056,786 A | 5/2000 | Rivera et al. | |
| 6,093,215 A * | 7/2000 | Buxton et al. | 717/107 |
| 6,138,119 A * | 10/2000 | Hall et al. | 707/9 |
| 6,253,193 B1 | 6/2001 | Ginter et al. | |
| 7,587,368 B2 * | 9/2009 | Felsher | 705/65 |
| 2002/0010679 A1 * | 1/2002 | Felsher | 705/51 |
| 2002/0077988 A1 * | 6/2002 | Sasaki et al. | 705/59 |
| 2002/0099947 A1 * | 7/2002 | Evans | 713/193 |
| 2003/0028489 A1 * | 2/2003 | Williamson | 705/59 |
| 2003/0050804 A1 * | 3/2003 | Hendershot | 705/4 |
| 2004/0003269 A1 * | 1/2004 | Waxman et al. | 713/193 |

OTHER PUBLICATIONS

Bonczek, et al., "A Transformational Grammar-Based Query Processor for Access Control in a Planning System", ACM Transactions on Database Systems, vol. 2, No. 4, Dec. 1977, pp. 326-338.

* cited by examiner

*Primary Examiner*—Evens J Augustin
*Assistant Examiner*—Nancy T Le
(74) *Attorney, Agent, or Firm*—Workman Nydegger

(57) ABSTRACT

A computer-implemented mechanism for granting rights is described. A license may be used to identify one or more principals, resources, rights and conditions. The license also identifies a license format scheme and a license format modification scheme. An access control module or other entity may interpret the license in accordance with the license format scheme and license format modification scheme.

17 Claims, 5 Drawing Sheets

SUBSTITUTION GROUPS/INHERITANCE FOR EXTENSIBILITY IN AUTHORIZATION POLICY

TECHNICAL FIELD

Aspects of the present invention relate to authorization policy languages and data structures. More particularly, aspects of the present invention provide a mechanism for extending an authorization policy language and data structure to provide abstract treatment of elements.

BACKGROUND OF THE INVENTION

Simple authorization policy data structures and, increasingly, more complex authorization policy languages have been used to grant rights to access digital data. FIG. 1 illustrates a conventional mechanism for granting rights to access a resource. A trusted issuer 100 issues a license 102 to a principal 104. License 102 allows principal 104 to use a resource 106. Resource 106 may be a digital work in the form of an image, an audio or video file, or an e-book. License 102 identifies principal 104, resource 106, the right granted and any conditions. Resource 106 may also be a service.

One common draw back to existing authorization languages and data structures is that once a mechanism has been established, the format of a license cannot be changed without significant modifications to existing licenses and software used to interpret the licenses. For example, the format of licenses may require the identification of the principal by a social security number. If it is necessary or desirable to identify the principal differently, such as by name, with prior art authorization languages and data structures existing licenses and software must be modified to make this change. These types of modifications can be prohibitively difficult to implement. One difficulty involves the requirement to coordinate among a large number of entities, such as trusted issuers, license holders, resources, and access control modules. The difficulty increases as the number of existing licenses increases. As a result, a less than optimal authorization mechanism may exist for certain applications.

Therefore, there is a need in the art to extend authorization languages and data structures to facilitate the use of the languages and data structures to new implementations. In particular, there is a need in the art for an authorization language and data structure that provides compatibility between updated licenses and existing infrastructure.

SUMMARY

One or more of the above-mentioned needs in the art are satisfied by the disclosed authorization languages and data structures. The disclosed languages and data structures improve upon existing languages by allowing for the modification of license formats after a license infrastructure has been implemented. A license may include a reference to one or more license format schemes and license format modification schemes. An access control module or other entity may interpret the license in accordance with the license format schemes and license format modification schemes.

BRIEF DESCRIPTION OF THE DRAWINGS

Aspects of the present invention are described with respect to the accompanying figures, in which like reference numerals identify like elements, and in which.

DETAILED DESCRIPTION

Aspects of the present invention are suitable for use in a distributed computing system environment. In a distributed computing environment, tasks may be performed by remote computer devices that are linked through communications networks. The distributed computing environment may include client and server devices that may communicate either locally or via one or more computer networks. Embodiments of the present invention may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, networked PCs, minicomputers, mainframe computers, and the like.

Aspects of the invention will be described in the general context of computer-executable instructions, such as program modules, that are executed by a processing device, including, but not limited to a personal computer. Generally, program modules include routines, programs, objects, components, data structures, etc., that perform particular tasks or implement particular abstract data types. Typically the functionality of the program modules may be combined or distributed as desired in various environments.

Embodiments within the scope of the present invention also include computer readable media having executable instructions. Such computer readable media can be any available media that can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
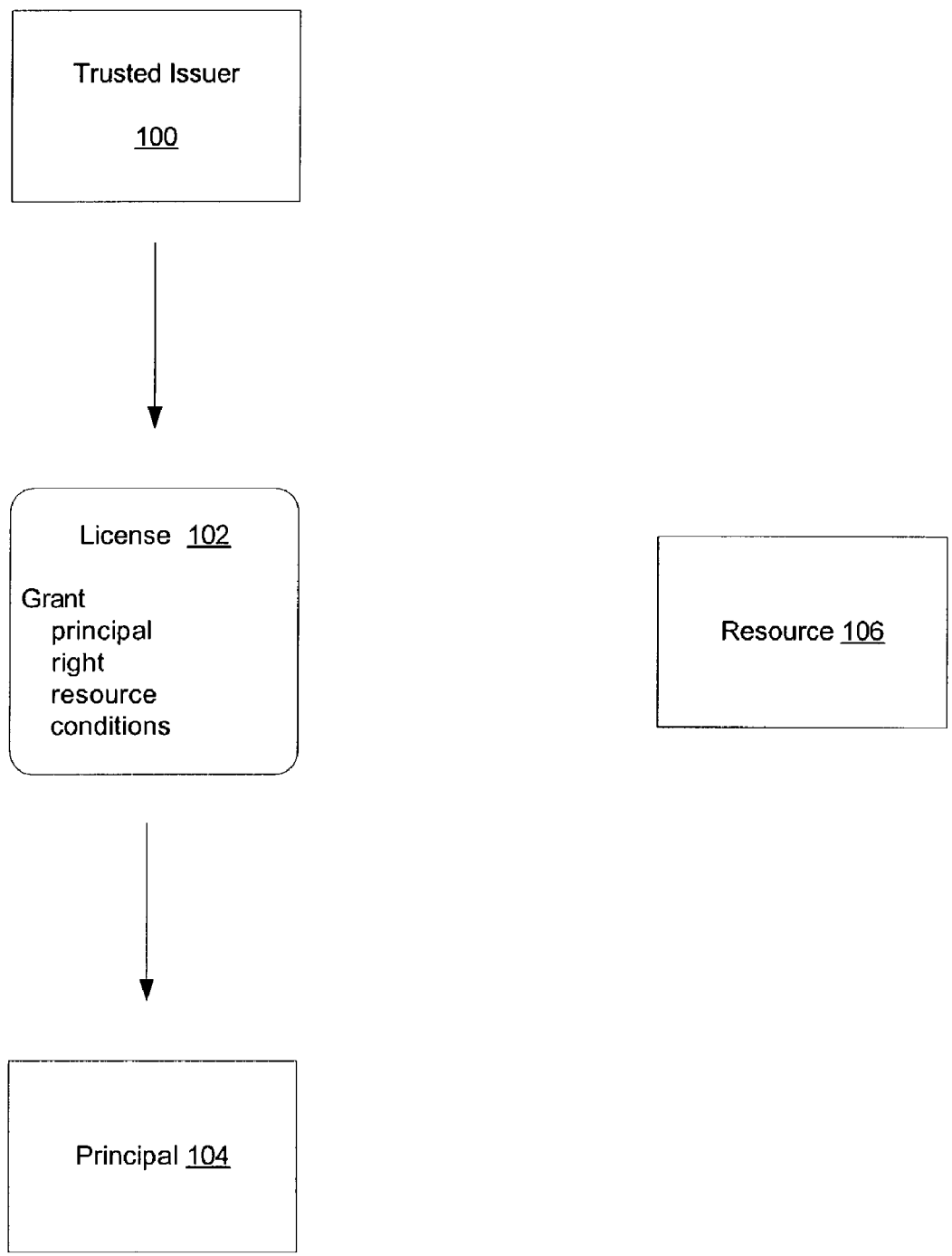
FIG. 1 illustrates a prior art mechanism for granting rights to access a resource.
Figure 2:
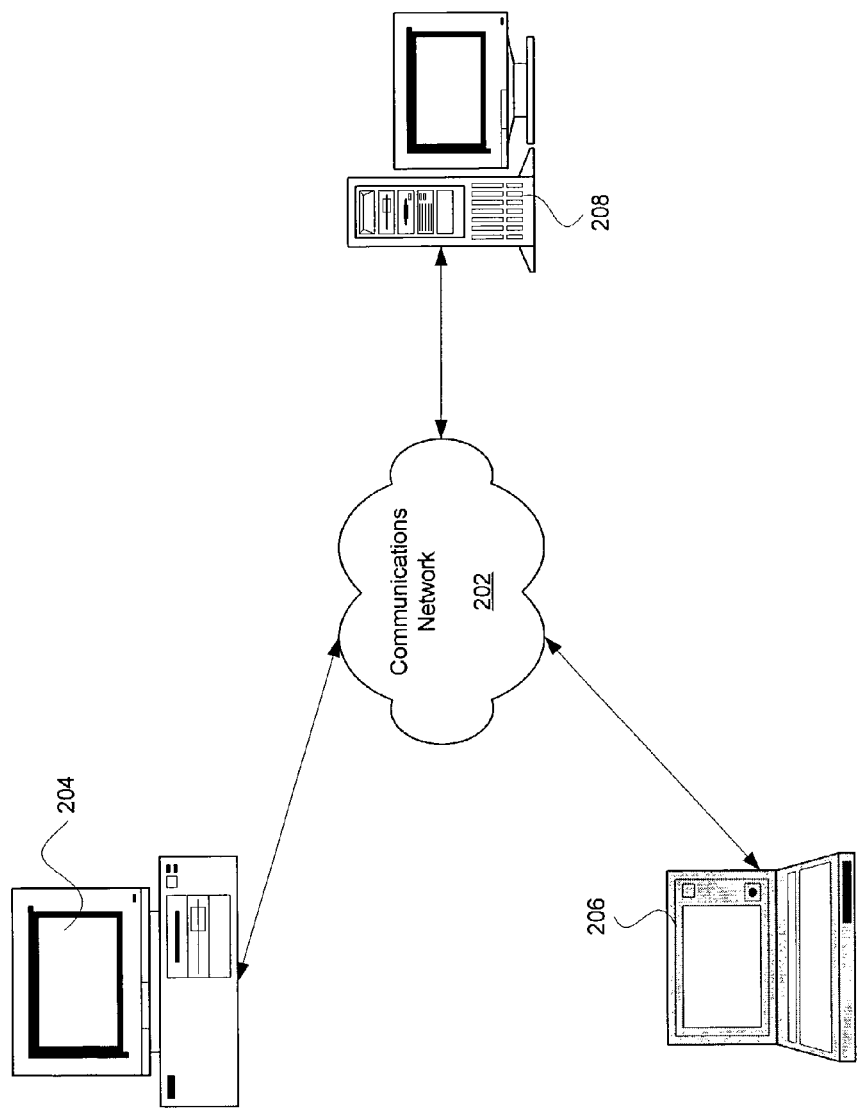
FIG. 2 illustrates an illustrative distributed computing system operating environment in accordance with embodiments of the invention.

FIG. 2 illustrates an example of a suitable distributed computing system 200 operating environment in which the invention may be implemented. Distributed computing system 200 is only one example of a suitable operating environment and is not intended to suggest any limitation as to the scope of use or functionality of the invention. System 200 is shown as including a communications network 202. The specific network implementation used can be comprised of, for example, any type of local area network (LAN) and associated LAN topologies and protocols; simple point-to-point networks (such as direct modem-to-modem connection); and wide area network (WAN) implementations, including public Internets and commercial based network services such as the Microsoft Network or America Online's Network. Systems may also include more than one communication network, such as a LAN coupled to the Internet Computer device 204, computer device 206 and computer device 208 may be coupled to communications network 202 through communication devices. Network interfaces or adapters may be used to connect computer devices 204, 206 and 208 to a LAN. When communications network 202 includes a WAN, modems or other means for establishing a communications over WANs may be utilized. Computer devices 204, 206 and 208 may communicate with one another via communication network 202 in ways that are well known in the art. The existence of any of various well-known networking standards or protocols, such as Ethernet, TCP/IP, FTP, HTTP and the like, is presumed. Computers devices 204, 206 and 208 may exchange content, applications, messages and other objects via communications network 202.

Figure 3:
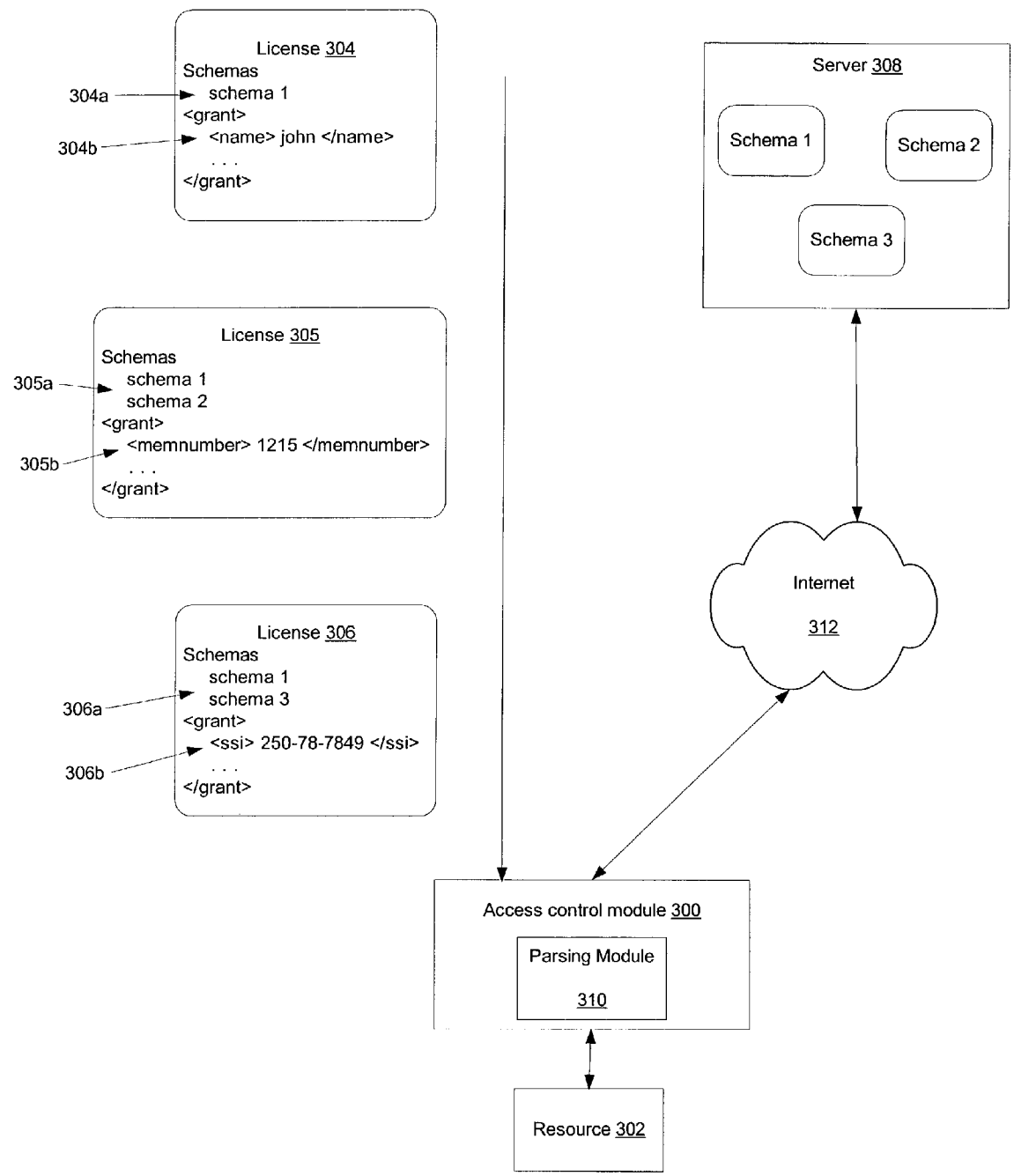
FIG. 3 illustrates a system for granting rights to a resource, in accordance with an embodiment of the invention.

FIG. 3 illustrates a system that may be used to grant rights to a resource 302. A group of licenses 304, 305 and 306 are presented to access control module 300, which mediates access to resource 302. Access control module 300 may be a software or hardware module, residing locally or remotely. Resource 302 may be a digital work in the form of an image, an audio or video file, an e-book or some other digital file or service. In alternative embodiments, licenses may be used to grant intransitive-verb-like rights. For example, a license may grant Bob the right to whistle. License 304 includes a field 304a that identifies a license format scheme. The license format scheme may be in the form of an extensible rights markup language (XrML) schema. The license format scheme will be used by access control module 300 to interpret or process license 304. The license format scheme is embodied as a data structure specifying constraints on the license. For example, the license format scheme may name the specific fields which appear in a license, define what type of data is allowed for each specific field in the license, and define how different fields (and other license elements) relate to one another. For example, license 304 may include fields identifying a right, the resource, and any relevant conditions in accordance with a license format scheme. The principal field is the only field shown for illustration purposes only. The principal is identified in field 304b. In particular, the name "John" is shown between two "name" tags. It is appreciated that any tag or tags may be used to identify a name, right, or any other field. The identifiers used herein are for illustrative purposes only.

The format of license 304 corresponds to the license format scheme identified in field 304a. This format may also be stored at another location, such as at server 308. License 305 differs from license 304 in that the principal is identified by a member number in field 305b. The member number is included between "memnumber" tags. License 305 also includes a reference to a new license format modification scheme in field 305a. The license format modification scheme may also be implemented with an XrML schema. As will be described in more detail below, the license format modification scheme identified in field 305a may be stored in server 308 and may identify the differences between the scheme used to format the current license and the original license format scheme. License 306 identifies the principal by a Social Security number in field 306b. A Social Security number is included between two "ssi" tags. License 306 also includes a reference to a second license format modification scheme in field 306a. The license format modification scheme identified in field 306a may also be stored in server 308. When licenses 304, 305 and 306 are received at access control module 300, a parsing module 310 may be used to interpret the information within the respective license.

When interpreting license 304, parsing module 310 identifies the appropriate license format scheme by reading field 304a. In one embodiment of the invention, after receiving the identification of the license format scheme, access control module 300 may retrieve the license format scheme from server 308 via a wide area network, such as the Internet 312. In alternative embodiments of the invention, the license format scheme is stored locally within access control module 300 or stored with resource 302 or included as part of license 304. With the use of the appropriate license format scheme, parsing module 310 may identify the appropriate principal, rights, resource, and any relevant conditions.

One of the advantages of aspects of the present invention is that a license format may be modified after the creation of an original license format and the implementation of a system that utilizes the original license format. For example, FIG. 3 shows an embodiment in which the first license 304 was issued by a trusted issuer identifying the principal by name. A second license 305 identifies the principal by member number. At some point after the original implementation of the system, it may have been determined that it is more efficient or accurate to identify principals by member number and not their name. In order to provide the updated information to access control module 300, license 305 includes a reference to the original license format scheme and a license format modification scheme in field 305a. The license format modification scheme may modify the original license format scheme by indicating that principals are identified by member number instead of their name. Similarly, license 306 includes a reference to the original license format scheme and a new license format modification scheme in field 306a. The license format modification scheme indicates that principals are identified by a Social Security number. As a result of the extensibility added by aspects of the present invention, access control module 300 is able to process a variety of licenses that have a variety of different formats without requiring significant modifications. Even when the trusted issuer or other party decides to issue licenses by identifying principals by membership number, it is not required that the trusted issuer reissue all of the existing licenses that identified principals by their name.

Figure 4:
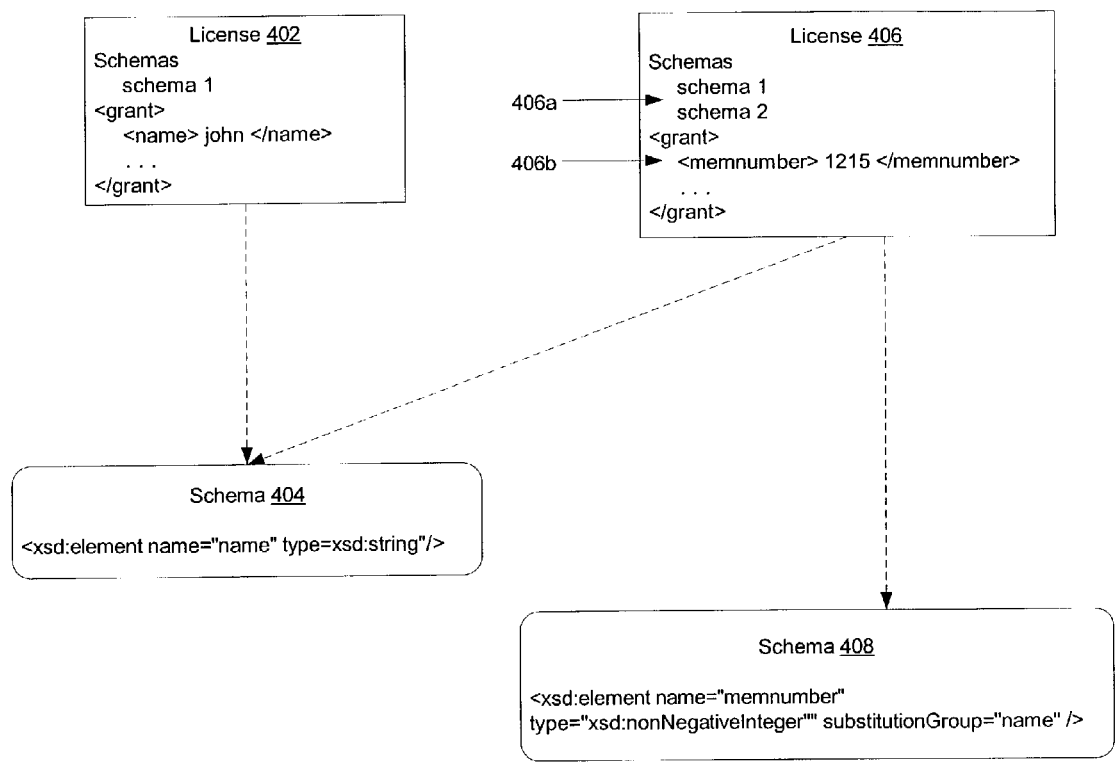
FIG. 4 illustrates a relationship between licenses and license format schemes, in accordance with an embodiment of the invention.

FIG. 4 illustrates a relationship between licenses and license format schemes, in accordance with an embodiment of the invention. A first license 402 is formatted in accordance with a first license format scheme 404. License 402 may include a variety of additional fields that are not shown. Such fields may include the identification of one or more rights, one or more resources and/or one or more conditions. The principal field is shown for illustration purposes only. When an access control module or other entity is interpreting license 402, license format scheme 404 may be used to interpret the license. License format scheme 404 shows that the data included between the "name" tags will be a string.

License 406 identifies a principal by a member number, and not name. License 406 may include a reference to license format scheme 404 and a license format modification scheme 408. A purpose of license format modification scheme 408 is to describe the differences between the format of license 406 and license format scheme 404. As an example, with the exception of the member number field 406b, license 406 may include one or more rights, resources, and/or conditions formatted in accordance with license format scheme 404. License format modification scheme 408 shows that license format scheme 404 has been modified to replace the "name" field with the "memnumber" field and that the member number is in the form of a nonnegative integer. When processing license 406, an access control module or other entity would interpret the license in accordance with license format scheme 404 and any modifications to license format scheme 404 made by license format modification scheme 408.

The embodiment shown in FIG. 4 does not require the types of the "name" and "memnumber" fields to be the same. In an alternative embodiment of the invention, the types on the elements in question must have a derivation relationship.

As an illustrative example, license format modification scheme 408 is shown in the extensible rights markup (XrML) language format. The substitution group mechanism is used to indicate that the data initially identified by the "name" tags has been replaced with new information identified by "memnumber" tags. Of course, one skilled in the art will appreciate that numerous languages and data structures may be used in alternative embodiments of the invention. For example, an object-oriented programming language such as C++, C#, Java, or Eiffel may be used. In some embodiments, the license format modification scheme may replace a class that exists in an original license format scheme with a new class or may subclass the original class. In other embodiments, the new class may be an extension of the original class.

Figure 5:
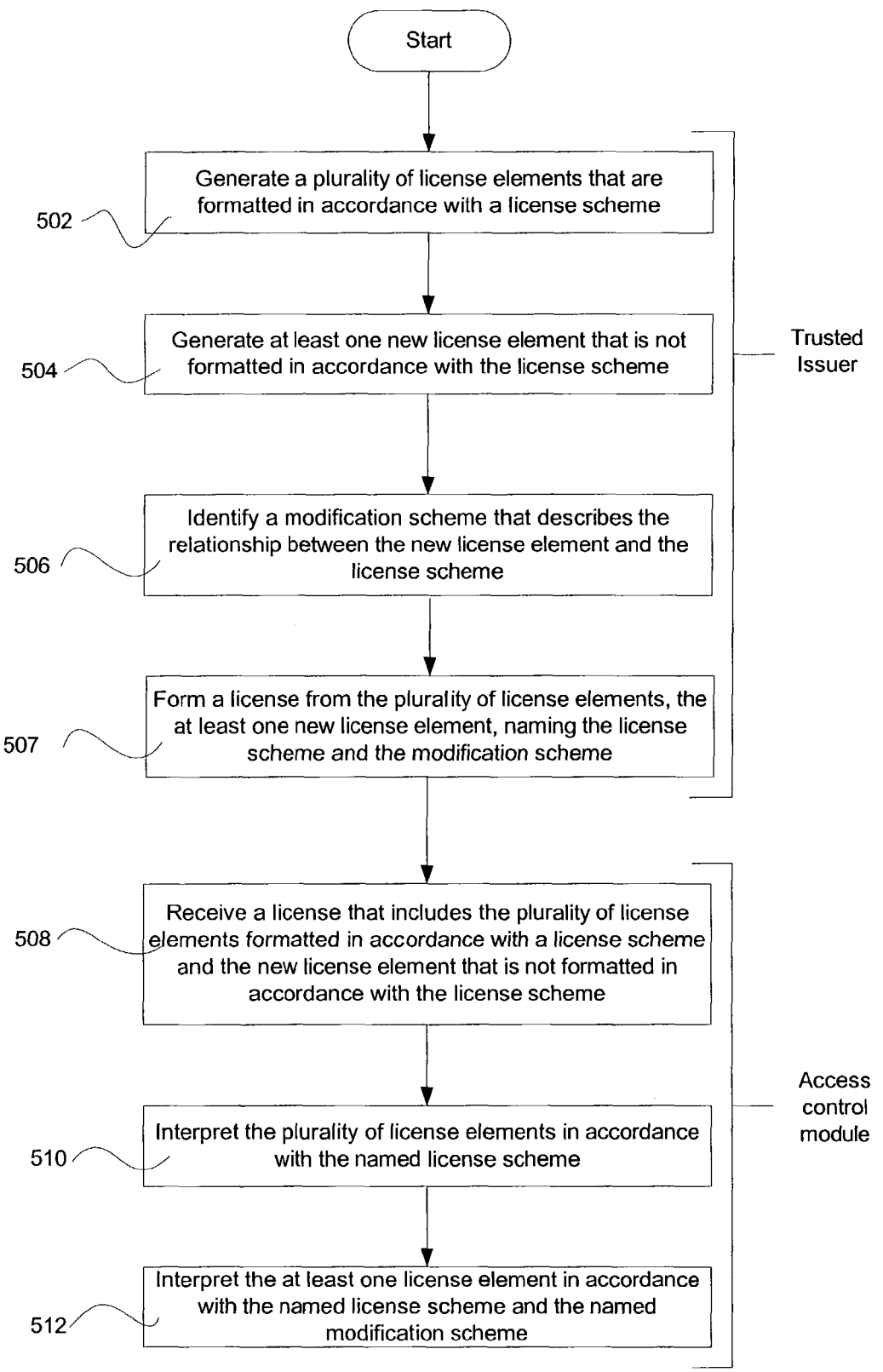
FIG. 5 illustrates a method of creating and processing a license in accordance with an embodiment of the invention.

FIG. 5 illustrates a method of granting and processing rights by a trusted issuer and the access control module in accordance with an embodiment of the invention. First, in step 502 the trusted issuer generates a plurality of license elements formatted in accordance with a license scheme. The license elements may be used to identify a principal, one or more rights, resources, and/or conditions. Next, in step 504, the trusted issuer generates at least one new license element that is not formatted in accordance with the license scheme. As described above, the new license element may be the result of a desired change to an existing system. A license modification scheme that describes a relationship between the new license element and the original license scheme is identified in step 506. The license modification scheme may be used by an access control module, parsing module or other entity for interpreting the format of a license. The license is constructed from the plurality of license elements and at least one new license element, naming the named scheme and the named modification scheme in step 507.

The resulting license may then be transmitted to an access control module. In step 508, the access control module receives a license that includes a plurality of license elements formatted in accordance with the license format scheme and the at least one new license element that is not formatted in accordance with the license format scheme. Next, in step 510 the access control module interprets the plurality of license elements in accordance with the license format scheme and, in step 512, the access control module interprets the new license elements in accordance with the license format scheme as modified by the license modification scheme.

In an embodiment that uses data structures, the data structure, such as a grant data structure, may be presented to a computer program that is configured to understand the form of the data structure and perform appropriate actions based on the contents of the data structure in order to arrive at an appropriate authorization decision. The data structures may be passed to the computer program via a variety of methods, including but not limited to using a shared memory and passing of data and/or objects among processors in a distributed computer environment, such as described in FIG. 2.

Further, embodiments of the invention may be implemented in hardware, software, or by an application specific integrated circuit (ASIC). The firmware may be in a read-only memory and the software may reside on a medium including, but not limited to, read-only memory, random access memory, floppy disc or compact disc.

The present invention has been described in terms of preferred and illustrative embodiments thereof. Numerous other embodiments, modifications and variations within the scope and spirit of the appended claims will occur to persons of ordinary skill in the art from a review of this disclosure.

We claim:

1. At a computer system including a processor and system memory, a computer-implemented method for generating a license comprising:
    storing a license format scheme as a first data structure, the license format scheme defining a plurality of license elements by specifying a field and an associated data type for each of the plurality of license elements;
    storing a modification scheme as a second data structure different than the first data structure, the modification scheme defining a replacement license element to replace one of the plurality of license elements defined in the license format scheme, wherein the replacement license element differs from the replaced license element in at least one of the field and associated data type specified therein; and
    generating a digital license using at least one of the processor and the system memory which includes:
        at least one of the plurality of license elements defined in the license format scheme,
        the replacement license element as defined by the modification, and
        one or more fields identifying both the license format scheme and the modification scheme;
    wherein the modification scheme describes the relationship between the replacement license element and the corresponding license element of the license format scheme replaced thereby, and
    wherein the one or more fields in the digital license causes a parsing module to interpret the digital license in accordance with the license format scheme and the modification scheme.

2. The computer-implemented method of claim 1, wherein the modification scheme further defines a new license element, wherein a type of the new license element is an extension of a type of one of the plurality of license elements defined in the license format scheme.

3. The computer-implemented method of claim 1, wherein the license is created with an object-oriented programming language.

4. The computer-implemented method of claim 1, wherein the digital license includes at least one of license element pertaining to a right associated with a digital work resource.

5. The computer-implemented method of claim 4, wherein the right includes the right to download the digital work.

6. The computer-implemented method of claim 1, wherein the digital license includes at least one license element pertaining to a right associated with a service.

7. The computer-implemented method of claim 1, wherein the license format scheme comprises an XML schema.

8. The computer-implemented method of claim 1, wherein the modification scheme comprises an XML schema.

9. At a computer system including a processor and system memory, a computer-implemented method of processing a license that grants rights, the method comprising:
    receiving a digital license including:

at least one of a plurality of license elements defined in a license format scheme, the license format scheme being stored as a first data structure, the license format scheme specifying a field and an associated data type for each of the plurality of license elements, a replacement license element defined in a modification scheme as a modification to the license format scheme, the modification scheme being stored as a second data structure different than the first data structure, the replacement license element being defined by the modification scheme to replace one of the plurality of license elements defined in the license format scheme, wherein the replacement license element differs from the replaced license element in at least one of the field and associated data type specified therein, and one or more fields identifying both the license format scheme and the modification scheme;

reading the one or more fields to determine that the digital license is to be interpreted in accordance with the license format scheme and the modification scheme; and interpreting the digital license using at least one of the processor and the system memory in accordance with the license format scheme and the modification scheme, wherein the modification scheme describes the relationship between the replacement license element and the corresponding license element of the license format scheme replaced thereby.

10. The computer-implemented method of claim 9, wherein the digital license is created with an object-oriented programming language.

11. The computer-implemented method of claim 9, wherein the digital license includes at least one license element pertaining to a right associated with a digital work resource.

12. The computer-implemented method of claim 11, wherein the right includes the right to download the digital work.

13. The computer-implemented method of claim 9, wherein the digital license includes at least one license element pertaining to a right associated with a service.

14. A computer-readable medium containing computer-executable instructions for causing a computer device to perform the steps, said instructions comprising:

receiving a digital license including:
at least one of a plurality of license elements defined in a license scheme, the license format scheme being stored as a first data structure, the license format scheme specifying a field and an associated data type for each of the plurality of license elements, a replacement license element defined in a modification scheme as a modification to the license format scheme, the modification scheme being stored as a second data structure different than the first data structure, the replacement license element being defined by the modification scheme to replace one of the plurality of license elements defined in the license format scheme, wherein the replacement license element differs from the replaced license element in at least one of the field and associated data type specified therein, and one or more fields identifying both the license format scheme and the modification scheme;

reading the one or more fields to determine that the digital license is to be interpreted in accordance with the license format scheme and the modification scheme; and interpreting the digital license in accordance with the license format scheme and the modification scheme, wherein the modification scheme describes the relationship between the replacement license element and the corresponding license element of the license format scheme replaced or extended thereby.

15. A computer-readable medium having stored thereon the digital license of claim 1, said digital license being a data structure comprising:
a first field identifying a first document comprising the license format scheme; and
a second field identifying a second document comprising the modification scheme,
wherein when said license data structure is read by a computer comprising the parsing module, the first field causes the computer to interpret the at least one of the plurality of license elements in accordance with the first document, interpret the second field causes the computer to interpret the replacement license element in accordance with the second document, and grant a right associated with a digital work resource to a principal identified in said license data structure.

16. The computer-readable medium of claim 15, wherein the license data structure comprises at least one of:
a principal element identifying the principal to which the right associated with the digital work resource is granted, and
a right element identifying the right being granted to the principal.

17. The computer-implemented method of claim 9, further comprising:
granting a right to a digital work resource to a principal based on the interpreting step, the principal being identified by an element in the digital license.

* * * * *